United States Patent [19]
Woudsma et al.

[11] Patent Number: 5,724,535
[45] Date of Patent: Mar. 3, 1998

[54] DATA PROCESSING SYSTEM

[75] Inventors: Roberto Woudsma, Eindhoven; Andrew C. Turley, Nijmegen, both of Netherlands; David P. Elias, Hobart, Australia

[73] Assignee: U.S. Philips Corporation, New York, N.Y.

[21] Appl. No.: 529,182

[22] Filed: Sep. 15, 1995

[30] Foreign Application Priority Data

Sep. 15, 1994 [EP] European Pat. Off. .............. 94202663

[51] Int. Cl.$^6$ .................. G06F 9/06; G06F 9/44; G06F 9/40
[52] U.S. Cl. ............... 395/391; 395/382; 364/DIG. 1; 364/DIG. 2
[58] Field of Search .................. 395/588, 312, 395/391, 551, 581, 706, 800, 24, 381, 382, 452; 365/189.04, 189.01, 189.05; 341/55; 364/DIG. 1, DIG. 2

[56] References Cited

U.S. PATENT DOCUMENTS

| | | |
|---|---|---|
| 5,057,837 | 10/1991 | Colwell et al. ........................... 341/55 |
| 5,175,824 | 12/1992 | Soderbery et al. ....................... 395/312 |
| 5,280,620 | 1/1994 | Sluijter et al. ....................... 364/DIG. 1 |
| 5,333,280 | 7/1994 | Ishikawa et al. ....................... 395/588 |
| 5,355,335 | 10/1994 | Katsuno ............................. 365/189.04 |
| 5,471,593 | 11/1995 | Branigin ................................. 395/24 |

OTHER PUBLICATIONS

"A Programmable Instruction Format Extension to VLIW Architectures", by A. DeGloria et al, Computer Systems and Software Engineering, IEEE, May 4–8, 1992, pp. 35–40.

*Primary Examiner*—Daniel H. Pan
*Attorney, Agent, or Firm*—Debra K. Stephens

[57] ABSTRACT

The invention relates to a data processing system, having a number of data processing units and a program memory for instruction words, each of which has separate command fields for the various data processing units so that the data processing units can be independently controlled by means of a program. The data terminals of the data processing units are interconnected via various buses. The connections established by the buses are controlled, via an expander, by way of a control field in the instruction word. The expander provides a limited repertory of feasible connections, selected in dependence on the type of program.

10 Claims, 3 Drawing Sheets

DATA PROCESSING SYSTEM

BACKGROUND OF THE INVENTION

1. Field of the Invention

The invention relates to a data processing system, having: data processing units. Each of the data processing unit has data terminals. A program counter is coupled to program memory in order to address an instruction word. The instruction word includes a number of command fields and the program memory is being coupled to the data processing units in order to apply each command field to a respective data processing unit. Connection elements which connect different terminals. Each connection element physically connects at least two inputs and at least two outputs from among the data terminals. The connection elements are coupled to the program memory means in order to receive a control signal embodied in the instruction word, the control signal making a selection as to between which inputs and outputs thereof an own data connection is established by the connection element.

2. Description of the Related Art

A data processing system of this kind is known from U.S. Pat. No. 5,280,620. Examples of data processing units are arithmetic/logic units (ALUs), multipliers, data memories with autonomous addressing modes, an input/output unit etc. The program memory means of this data processing system are composed of sub-memories, each of which is intended for the commands for a respective data processing unit. In each instruction cycle the program counter produces a new address whereby commands are read in parallel from the various sub-memories. The commands executed by the various data processing units are thus independent of one another and parallelism between the data processing units can be used to the full for writing the program. Because a large number of separate commands are required for different data processing units during each instruction cycle, such an architecture is also referred to as a VLIW (Very Long Instruction Word) architecture.

Data must be transported between the various data processing units during operation. To this end, the system disclosed in the cited publication comprises connection elements in the form of data buses which are connected so as to be controllable at intersections to lines extending to the data terminals of the individual data processing units. Control codes for these intersections are stored in the sub-memories, together with the commands for the data processing units. In each instruction cycle each sub-memory outputs these control codes for control of intersections.

In an integrated circuit the program memories together occupy a considerable space, notably when there are many data processing units and the program contains many instructions.

SUMMARY OF THE INVENTION

It is inter alia an object of the invention to reduce the memory space required for the program.

The data processing system in accordance with the invention is characterized in that the instruction word comprises a control field and that the coupling comprises an expander for selecting together, under the control of the control field, at least the own data connections which are established by a first and a second one of the connection elements, the expander providing a number of feasible first selections for the own data connection of the first connection element and, for each feasible first selection, only a respective, possibly empty, group of second selections for the data connection of the second connection element, at least two of the respective groups deviating from one another in more respects than necessary for restriction to consistent data connections.

Via the expander, a single control field thus selects the data connections established by the various connection elements, without the control field being separable into sub-fields for mutually independent selections in the various connection elements.

For example, if a data connection from a memory to an input register of an ALU is selected for the first connection element, a group of connections from or to other registers in the relevant ALU can be rendered selectable for the second connection element whereas, if for the first connection element a connection is selected between an output register of the ALU and an output unit, the group of selectable connections for the second connection element is empty, so that no connections are possible via the second connection element. Restrictions of this kind are more drastic than necessary for the exclusion of inconsistent combinations of data connections, such as combinations where the first and the second connection element establish a data connection to the same input, which combination does not make sense, regardless of the program being executed.

The invention is based on the idea that during the execution of specific programs for a set of cooperating data processing units usually coherence is found between the data connections occurring. It has been found that far from all feasible configurations of data connections occur in a complete program. To the contrary, it appears that in dependence on the type of program (a type comprising, for example filtering operations or a type with fast Fourier transforms), a specific, limited repertory of connection configuration occurs. For the writing of a program for the system, therefore, limitations can be accepted for this repertory without incurring an essential restriction of the degree whereto parallelism can be utilized in a specific application.

Despite the fact that the data processing system is free to control the data processing units independently of one another, for a system which is to execute only a specific type of program it is thus not necessary that the data connections of the various data processing units can also be controlled independently of one another. This holds notably for "embedded" signal processors whose design is specially adapted to a single, specific type of apparatus, for example a radio receiver or a decoder unit.

The invention utilizes the described idea by no longer including the connections for each data processing unit separately in the instruction, but by using instead a single control field of the instruction for selecting one of the limited repertory of configurations of feasible connections. Depending on which data connection is established by the first connection element, the control field need then select from only a part of the physically feasible data connections in order to control the second connection element. As a result, the control field consisting of bits can be made shorter without the degree of feasible parallelism of programs being substantially reduced.

It is to be noted especially that this is the consequence of the use of programs of a given type and not of the use of only a limited number of different commands for the data processing units. The limitation of the repertory of connections, therefore, also makes sense in "pipelined" systems. Pipelining means that the data transported via the connection elements during a given instruction cycle have been produced during a previous instruction cycle and/or will be treated during a later instruction cycle. The respective command fields of the instruction in this case concern data other than the data whose transport is controlled by the control field of the same instruction. In these circumstances it remains attractive to utilize the control field of the instruction for the selection of one of the limited repertory of configurations of feasible connections.

An embodiment of the data processing system in accordance with the invention is characterized in that the program memory means are connected to the data processing units via connection means which comprise a control input, and that the expander selects a further control signal for the connection means by expansion of the control field and applies this further control signal to the control input so as to control which command field of the instruction word is applied to which data processing unit, and that for each feasible first selection the expander provides only a respective, possibly empty further group of further selections for the further control signal, at least two of the respective further groups deviating from one another. The number of bits required per instruction is thus further limited, without imposing a substantial restriction as regards the degree whereto parallelism can be utilized in a specific type of program.

The use of connection means for controlling, controlled by a format selection field of the instruction word, which part of the instruction is executed by which data processing unit is known per se from a publication by A. De Gloria: "A Programmable Instruction Format Extension to VLIW Architecture", published in "CompEuro 1992 Proceedings, Computer Systems and Software Engineering", pp. 35–40, "IEEE Computer Society Press", Los Alamitos, Calif. De Gloria also shows that the format selection field controls the connection means via an expander which allows for a limited number of connection configurations for instruction transport between the memory and the data processing units. De Gloria, however, does not make any suggestions as regards an expander for selecting a limited number of connection configurations for data transport between the various data processing units, leave alone as regards the combination of the choice of connections for data transport and instruction transport.

An embodiment of the data processing system in accordance with the invention is characterized in that the expander is coupled to at least one of the data processing units in order to form, under the control of the control field, a control command for the at least one of the data processing units, and that for each first selection the expander provides only a respective, possibly empty, further group of selectable control commands, at least two of the respective further groups deviating from one another. Thus, in a part of the data processing units the command execution is controlled, via the expander, at least partly together with the connection elements. It has been found that the number of bits required per instruction is thus further limited without essentially limiting the degree whereto parallelism can be used in a specific type of program.

An embodiment of the data processing system in accordance with the invention is characterized in that at least one of the data processing units comprises a first and a second register, each of which is physically coupled to the connection elements for data supply via a respective data terminal, the first selections comprising a number of data connections to the first register and the respective groups comprising a number of data connections to the second register. The invention can thus also be used for data processing units whose registers can be simultaneously loaded in an independent fashion.

A further embodiment of the data processing system in accordance with the invention is characterized in that the coupling comprises a register for the storage and transmission of the control signal to the connection elements while a next control signal is being formed. The register provides pipelining, so that any delay due to the insertion of the expander between the program memory means and the connection means does not cause a reduction of the maximum usable instruction frequency. It may then occur, however, that the control field of an instruction is used in an instruction cycle other than the command fields of the relevant instruction. It has been found that this does not essentially restrict the degree whereto parallelism can be used in a specific type of program, because the effect of the invention results from the use of a program of a given type and not from the use of only a limited number of different commands for the data processing units.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
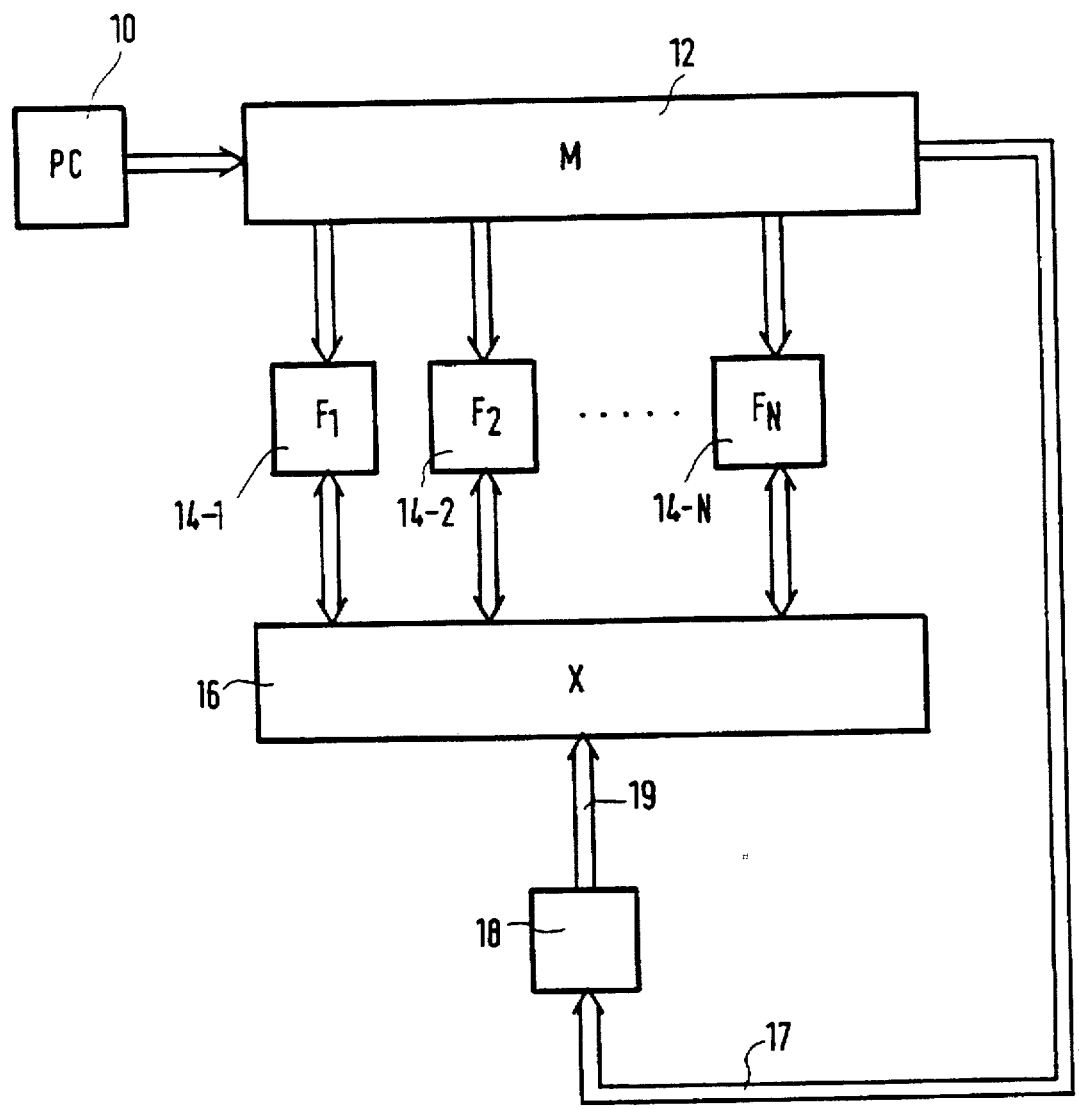
FIG. 1 shows a first embodiment of the data processing system in accordance with the invention.

FIG. 1 shows a first embodiment of the data processing system in accordance with the invention. This system comprises a program counter 10 which has an output coupled to an address input of a program memory 12. The program memory 12 comprises a number of locations for the storage of program instructions. The program memory 12 comprises a number of outputs (four, by way of example) which are coupled to a number of respective data processing units 14-1, 14-2 . . . 14-N (three of which are shown by way of example) and to an expander 18. The data processing units 14-1, 14-2 . . . 14-N are interconnected via connection means 16. The expander 18 comprises an output which is coupled to the connection means 16.

For the data processing unit use can be made of, for example a unit of the ALU (arithmetic logic unit), multiplier or memory type. One or more of each type may be included as desired. Each data processing unit 14-1, 14-2 . . . 14-N comprises a number of inputs and outputs for operands and results, which number is dependent on the type. For example, a multiplier normally has two inputs for operands and one output for a resultant product, whereas a memory often comprises only a data input and a data output (the memory receives an address as part of the instruction, or the memory itself contains an address register in which writing can take place in a separate instruction cycle). These inputs and outputs are connected to connection means 16. Irrespective of the number of inputs and outputs, for the sake of simplicity FIG. 1 shows the inputs and outputs of all data processing units as one double arrow.

During operation the program counter 10 generates successive addresses for the program memory 12 during successive instruction cycles. In response to each address, the program memory 12 reads an instruction word stored at the location indicated by the address. The program memory 12 outputs the various fields of this instruction. These fields comprise command fields for the various data processing units 14-1, 14-2 ... 14-N and a control field for the expander 18. Examples of the contents of the command field for the data processing units 14-1, 14-2 ... 14-N are, "ADD" or "SUBTRACT" codes for an ALU or "LOAD" and "STORE" codes for a memory unit.

The system thus is of the "VLIW" (Very Large Instruction Word) type. For the programming of such a system, prior to the execution of the program it is determined which operations must be executed in which instruction cycle by which data processing unit 14-1, 14-2 ... 14-N. For each instruction cycle an instruction word is then formed in which all command fields for the operations to be executed during the relevant cycle are included. The instruction words thus formed are stored in the program memory 12 so as to be executed in due time. The formation of the instruction word can be realised manually or, if necessary, by means of known VLIW compilation techniques.

In dependence on the contents of the command fields, the data processing units 14-1, 14-2 ... 14-N consume and/or produce data on their inputs and outputs. Via the connection means 16, the data produced by a data processing unit 14-1, 14-2 ... 14-N serve as input for another data processing unit. The connections established by the connection means are controlled under the influence of the control field applied to the expander 18.

The expander 18 is constructed, for example as a memory in which a repertory of control signals for the connection means 16 is stored. The address input 17 of this memory is coupled to the output of the program memory 12 and receives the control field of the instruction word, the data output of this memory being coupled to the control input 19 of the connection means 16 and applying control signals from addressed memory locations thereto. The control field comprises fewer bits than the control signals, so that the control field occupies less space in the program memory than would be necessary to enable the storage of all possible control signals. Consequently, the repertory of control signals which can be generated constitutes a sub-set within the set of all feasible control signals which would be functional on the control input 19 of the connection means 16.

This case should be distinguished from the case where the output of the program memory 12 is coupled directly to the control input 19 of the connection means 16 in such a manner that the connections of each data processing unit 14-1, 14-2 ... 14-N can be controlled independently of the connections of the other data processing units (ignoring inconsistencies such as the case where two data processing units serve as a source of data for the same input of another data processing unit). In the case of independent controllability, the set of control signals is reducible in the following, mathematical respect.

Reducibility is defined as follows. Let us take one of the data processing units and let us split the set of control signals into sub-sets in such a manner that within each of the sub-sets the connections established by means of the one data processing unit are the same, whereas these connections differ from one sub-set to another. It is then checked whether a map image of the sub-sets on one another exists in such a manner that each pair of control signals being an image of one another produce the same connections between the other data processing units as the one data processing unit (ignoring inconsistencies). When such an image exists, the set of control signals is called reducible over the one data processing unit. If the set of control signals which can be generated is reducible over each of the data processing units, the set of control signals that can be generated is called reducible.

When an expander 18 in accordance with the invention is used, the set of control signals which can be generated is irreducible. This constitutes a limitation of the freedom of control of the connection means 16. However, it has been found that even a substantial limitation hardly affects the performance of the data processing system.

Figure 2:
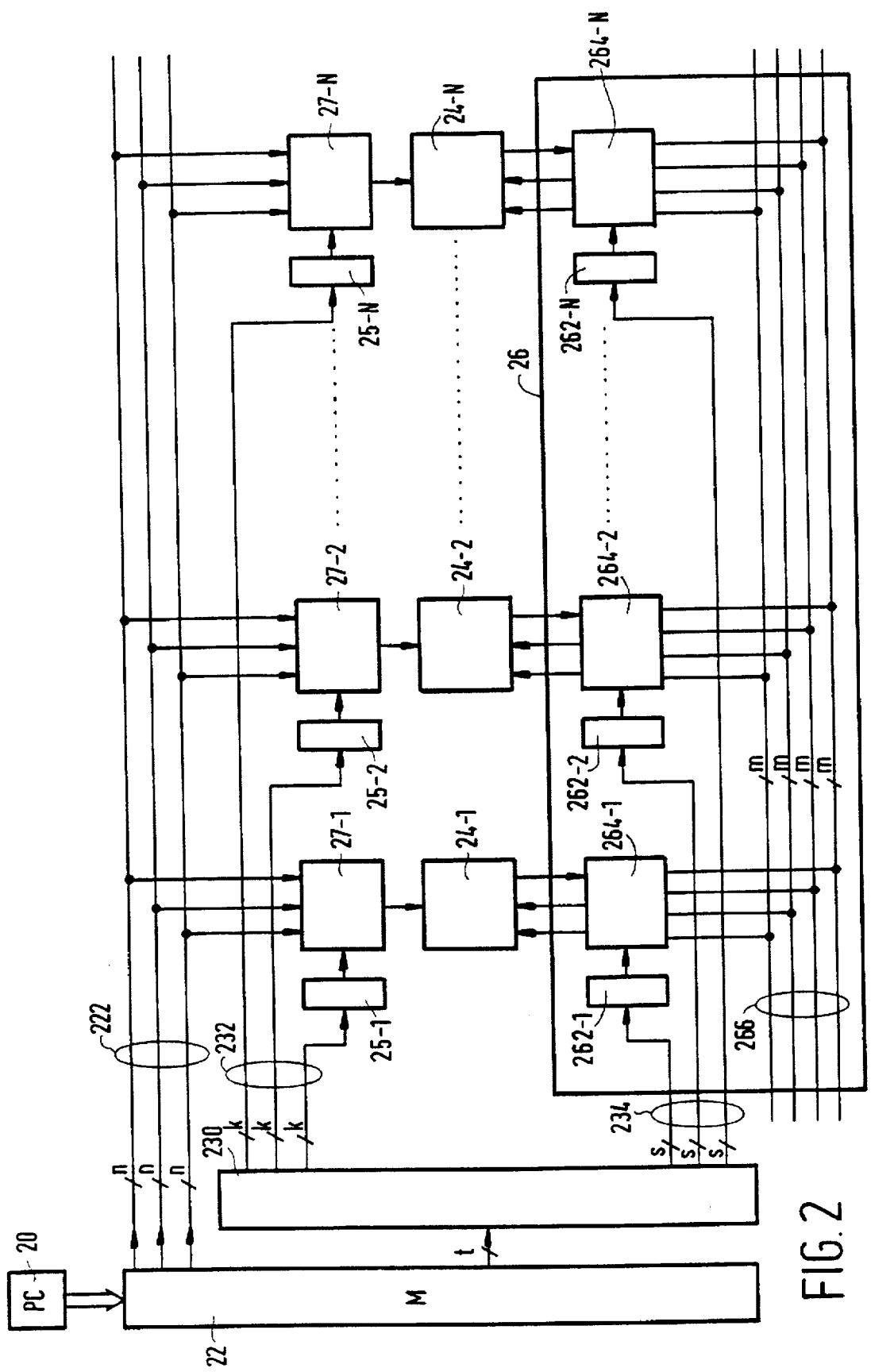
FIG. 2 shows a second embodiment of the data processing system in accordance with the invention.

FIG. 2 shows a second embodiment of the data processing system in accordance with the invention. This embodiment again comprises a program counter 20 which is coupled to a program memory 22. The data output of the program memory 22 is coupled on the one side to a system of instruction buses 222, each having a width of n bits, where n is, for example 5, and on the other side to an input of an expander 230 which has a width of t bits, t being, for example 5. The expander comprises a first and a second set of output lines 232, 234. Each of the lines of the first set 232 has a width of k bits, where k is, for example 3; each of the lines of the second set 234 has a width of s bits, where s is, for example 4.

The lines of the first set 232 are coupled to respective instruction selection registers 25-1, 25-2 ... 25-N. The instruction selection registers 25-1, 25-2 ... 25-N are coupled to respective instruction selectors 27-1, 27-2 ... 27-N. The instruction selectors 27-1, 27-2 ... 27-N are arranged between the set of instruction buses 222 and respective data processing units 24-1, 24-2 ... 24-N.

The lines of the second set 234 of outputs of the expander 230 are coupled to the connection means 26. The data processing units 24-1, 24-2 ... 24-N are interconnected via the connection means 26. In the connection means 26 the lines of the second set are coupled to respective data selection registers 262-1, 262-2 ... 262-N. The data selection registers 262-1, 262-2 ... 262-N are coupled to respective data selectors 264-1, 264-2 ... 264-N. The data selectors 264-1, 264-2 ... 264-N are arranged between a set of data buses 266 (each having a width of m bits, where m is, for example 16) and respective data processing units 24-1, 24-2 ... 24-N.

One of the data processing units 24-1, 24-2 ... 24-N is, for example a program control unit (PCU) and is connected (not shown) to the program counter 20 in order to execute, for example branch commands whereby the contents of the program counter are changed. Furthermore, the program control unit 24-1 comprises connections (not shown) to the other data processing units 24-2 ... 24-N in order to receive status information for use in conditional branch commands. The program control unit 24-1, moreover, is connected to the connection means for the transfer of so-called "immediate" data which may be distributed between a plurality of command fields of an instruction.

The connection means 26 operate as follows. The control signals on the second set 234 of lines, originating from the expander 230, are stored in the selection registers 262-1, 262-2 ... 262-N. These signals control the connections established between the data processing units 24-1, 24-2 ... 24-N by the data selectors 264-1, 264-2 ... 264-N.

When a data processing unit, for example 24-2, produces data on an output which are required as an operand by another data processing unit, for example 24-N, , the output of the producing data processing unit 24-2 is connected to one of the data buses 266 via the data selector 264-2. This data bus is then connected, via the selector 264-N associated with the receiving data processing unit 24-N, to the input of the receiving data processing unit 24-N. An output of another data processing unit can at the same time be connected to an input of a data processing unit, for example 24-1, or even to an input of two data processing units, for example 24-1 and 24-2.

As a result of the use of the selection registers 262-1, 262-2 ... 262-N, the control signals can be produced in an instruction cycle preceding the actual control by means of the expander 230. Thus the time required by the expander 230 to form these control signals in this manner does not reduce the instruction execution rate of the system.

Figure 3:
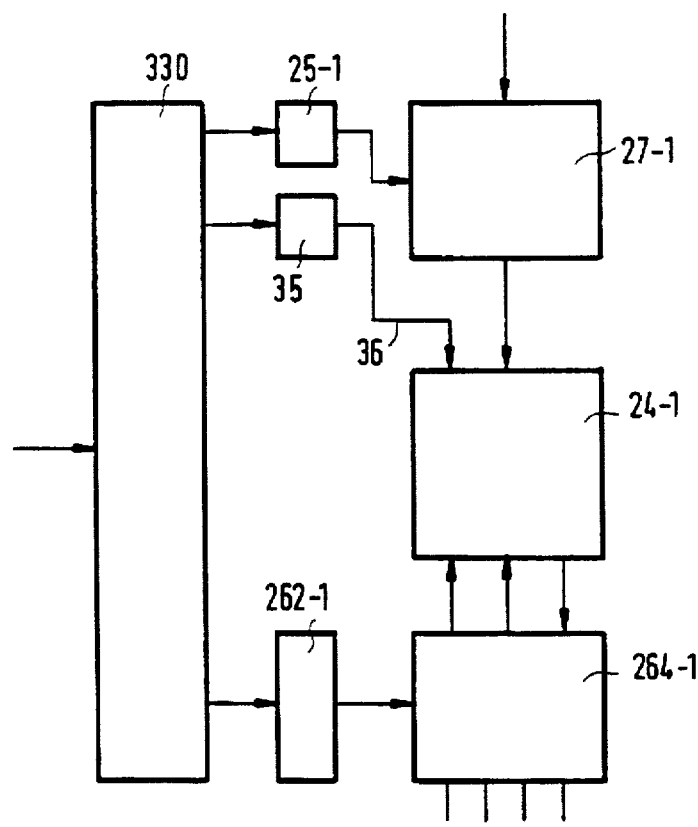
FIG. 3 shows an embodiment of the connection between an expander and a data processing unit.

FIG. 3 shows a further embodiment of the connection between the expander 230 and one of the data processing units 24-1 which can be used as desired for a part of the data processing units. Parts which correspond to FIG. 2 are denoted by the same reference numerals as used in FIG. 2. In addition to FIG. 2, FIG. 3 shows also a command register 35 whose output comprises a connection 36 to a command input of the data processing unit 34. As a result, a part of the control signal emanating from the expander 230 can be used directly as a command for the data processing unit 24-1. For example, commands can thus be issued which are closely related to data transport (for example, "increment address pointer register" upon reading of data when the data processing unit 24-1 is a memory unit).

Figure 4:
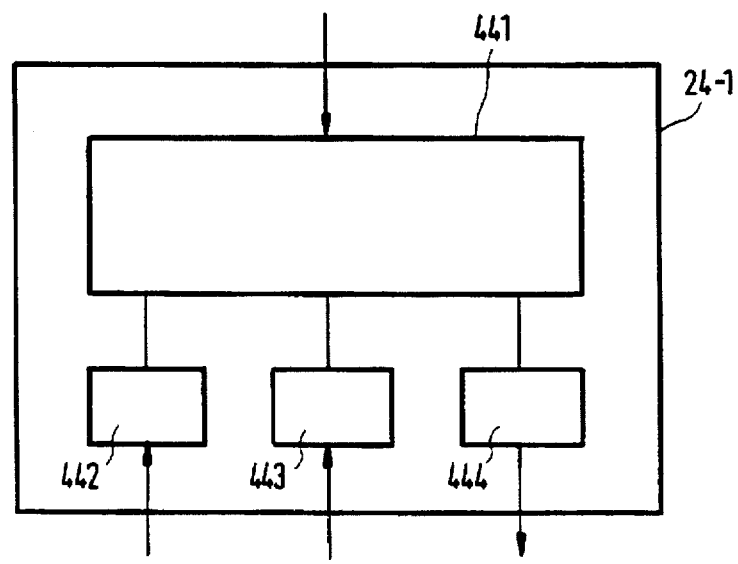
FIG. 4 shows an embodiment of a data processing unit.

FIG. 4 shows an embodiment of one of the data processing units 24-1. This embodiment comprises a functional unit 441 and a number of registers 442, 443, 444. The functional unit 441 is coupled to the instruction input; the registers are coupled between the data terminals and the functional unit. By way of example, two registers 442, 443 are shown as input registers and one register 444 as an output register. The functional unit executes the commands during operation, the data from the input registers 442, 443 then being processed and the result being stored in the output register 444. Using the control signals, the combinations of data connections extending, via the lines 266, from and to the registers 242, 243 and 444 can be independently controlled. However, the use of an irreducible set of combinations suffices, so that the expander 230 can be simplified.

The set of instruction buses 222 comprises fewer buses than there are data processing units 24-1, 24-2 ... 24-N. This results from the recognition of the fact that the number of simultaneously controllable data processing units 24-1, 24-2 ... 24-N can be limited without seriously degrading the performance. Therefore, the program memory 22 need not be so wide that it can output command fields (each of which forms a respective command for a data processing unit) for all data processing units 24-1, 24-2 ... 24-N separately in parallel; it suffices to output a smaller number of command fields in parallel. The instruction selectors 27-1, 27-2 ... 27-N ensure that these command fields are applied, via the set of instruction buses 222, to those data processing units 24-1, 24-2 ... 24-N which must be simultaneously active in a given clock cycle. The instruction selectors 27-1, 27-2 ... 27-N supply the other data processing units 24-1, 24-2 ... 24-N, for example conventionally with a NOP (no-operation) command.

The supply of command fields is controlled by means of the expander 230. From the program memory 22 the expander receives a part of the instruction word which indicates which parts of the instruction from the program memory 22 must be applied to which combination of data processing units 24-1, 24-2 ... 24-N. In the case of simultaneous use of N data processing units 24-1, 24-2 ... 24-N, each comprising an instruction selector 27-1, 27-2 ... 27-N responsive to P different control signals, a total of $P^N$ control signals would be feasible.

However, it has been found that for suitable programmability not all $p^N$ feasible combinations of connections between the set of instruction buses 222 and the data processing units 24-1, 24-2 ... 24-N need be selectable. Therefore, the expander 230 provides only control signals for a repertory of combinations constituting a sub-set of all feasible combinations. Mutatis mutandis this repertory is also irreducible in the previously stated sense, so that the repertory comprises fewer than $P^N$ control signals. Each time one control signal is selected from the repertory on the basis of the part of the instruction applied from the program memory 22 to the expander 230. This control signal is loaded into the registers 25-1, 25-2 ... 25-N and applied to the instruction selectors 27-1, 27-2 ... 27-N.

For example, the bits of the control field which determine the bus whereto the output of a given data processing unit is connected can also determine the bus whereto the input of another data processing unit is connected.

It has also been found that independent control of the connections which can be established by the instruction selectors 27-1, 27-2 ... 27-N and the connections which can be established by the data selectors 264-1, 264-2, 264-N is not necessary either. This fact is utilized to simplify the expander 230, so that it can supply only a limited number of combinations of control signals for the instruction selectors 27-1, 27-2 ... 27-N and control signals for the data selectors 264-1, 264-2 in response to the instruction received from the program memory 22.

Therefore, the set of control signals which can be generated for the data selectors 264-1, 264-2 ... 264-N and the instruction selectors 27-1, 27-2 ... 27-N cannot be reduced to a product of data and instruction selection. In this context reducibility to a product of data and instruction selection is defined as follows: the set of control signals which can be generated for the data selectors 264-1, 264-2 ... 264-N and the instruction selectors 27-1, 27-2 ... 27-N is split into sub-sets, in each of which the control of the instruction selectors 27-1, 27-2 ... 27-N is the same. Subsequently, it is checked whether a map image of the sub-sets on one another exists in such a manner that each pair of control signals which is a map image of one another results in the same control of the data selectors 264-1, 264-2 ... 264-N. If such a map image does not exist, the set of control signals cannot be reduced to a product of data and instruction selection.

In that case, if BI different control signals can be generated for the instruction selectors 27-1, 27-2 ... 27-N and BD control signals for the data selectors 264-1, 264-2 ... 264-N, less than BI×BD combinations of these control signals can be generated).

It has also been found that it is not necessary either to control the commands loaded into the command register 35 of FIG. 4 independently of the data connections established by the data selectors 264-1, 264-2 ... 264-N. This fact is also used to simplify the expander 230, so that it can supply only a limited number of combinations of commands for the command register 35 and control signals for the data selectors 264-1, 264-2 in response to the instruction received from the program memory 22.

Evidently, the Figures and the associated description concern merely nonlimitative embodiments of the invention. For example, the fact that the various buses and the various signal connections for the various data processing units are represented everywhere by the same numbers of lines is purely illustrative; in practice these numbers may differ from one bus to another and from one data processing unit to another.

Furthermore, the expander 18, 230 can be constructed in the described manner as a memory in which a different control signal is stored in each memory location. In that case the program memory 12, 32 supplies the address for the memory in the expander 18, 230 and the memory in the expander 18, 230 supplies the control signal as data read (the memory in the expander 18, 230 may be a RAM or an (E)(P)ROM, depending on the need for changing its contents). Instead of the memory, the expander 18, 230 may include a specially designed logic circuit with the same input/output relation. Generally speaking, the construction of this circuit may be smaller than the ROM version, because many selection signals are inactive for most control signals. Furthermore, for example the function of the data selectors 264-1, 264-2 . . . 264-N can be realised in the data processing units 24-1, 24-2 . . . 24-N.

The program stored in the program memory 12, 22 can be written by a human programmer, but use can alternatively be made of a compiler constructed for this purpose. This compiler makes a planning for the instructions required for the data processing units 24-1, 24-2 . . . 24-N and the necessary connections between the data processing units. If the connections which can control the expander 18, 230 are predetermined, the compiler should select one of these connections in order to implement the planned connection and it should also include the associated code for controlling the expander 18, 230 in the program.

Should a planned connection not be available in the sub-set of available connections, rearrangement of the program is necessary. For example, the compiler can postpone the execution of an instruction by a given data processing unit by one clock cycle. The required operand then remains stored for one clock cycle in a register in the data processing unit producing this operand. It is advisable to include at least all 1-to-1 connections between data processing units in the sub-set of available connections; in that case it is ensured that all programs can be executed, if necessary by means of instructions to be executed later. This might result in a slower program. It has been found in practice, however, that these slow downs are hardly significant when permissible connections are suitably chosen.

However, it is also possible for the compiler itself to determine which sub-set of connections can be established by the expander 18, 230. To this end, during compiling the compiler keeps a record of the connections which are required and it is ensured that the expander is capable of establishing exactly these connections. It is then also possible to make the compiler count how often each type of connection occurs. Types of connection which occur only rarely can subsequently be eliminated by rearrangement of the program, so that the expander can be simplified and the program memory reduced.

We claim:

1. A data processing system, comprising:
    data processing units, each of which comprises data terminals;
    a program counter coupled to program memory means, addressing an instruction word, the instruction word comprising a number of command fields and the program memory means, coupled to the data processing units, applying each command field to a respective data processing unit;
    connection elements which connect different data terminals, each connection element physically connecting at least two inputs and at least two outputs from among the data terminals, the connection elements being coupled to the program memory means to receive a control signal embodied in the instruction word, the control signal making a selection as to between which inputs and outputs thereof an own data connection is established by the connection element, the instruction word comprising a control field; and
    an expander for selecting together, coupled between said program memory means and said connection elements, under control of the control field, at least the own data connections which are established by a first and a second one of the connection elements, the expander providing a number of feasible first selections for the own data connection of the first connection element and, for each feasible first selection, only a respective, possibly empty, group of second selections for the data connection of the second connection element, at least two of the respective groups deviating from one another in more respects than necessary for restriction to consistent data connections.

2. A data processing system as claimed in claim 1, wherein:
    the program memory means are connected to the data processing units via connection means which comprise a control input,
    the expander selects a further control signal for the connection means by expansion of the control field and applies this further control signal to the control input so as to control which command field of the instruction word is applied to which data processing unit, and
    for each feasible first selection, the expander provides only a respective, possibly empty, further group of further selections for the further control signal, at least two of the respective further groups deviating from one another.

3. A data processing system as claimed in claim 2, wherein the expander is coupled to at least one of the data processing units in order to form, under control of the control field, a control command for the at least one of the data processing units, and that for each first selection the expander provides only a respective, empty, further group of selectable control commands, at least two of the respective further groups deviating from one another.

4. A data processing system as claimed in claim 2, wherein the coupling comprises a register for the storage and transmission of the control signal to the connection elements while a next control signal is being formed.

5. A data processing system as claimed in claim 3, wherein the coupling comprises a register for the storage and transmission of the control signal to the connection elements while a next control signal is being formed.

6. A data processing system as claimed in claim 1, wherein the expander is coupled to at least one of the data processing units in order to form, under the control of the control field, a control command for the at least one of the data processing units, and that for each first selection the expander provides only a respective further group of selectable control commands, at least two of the respective further groups deviating from one another.

7. A data processing system as claimed in claim 6, wherein the coupling comprises a register for the storage and transmission of the control signal to the connection elements while a next control signal is being formed.

8. A data processing system as claimed in claim 1, wherein at least one of the data processing units comprises a first and a second register, each of which is physically coupled to the connection elements for data supply via a respective data terminal, the first selections comprising a number of data connections to the first register and the respective groups comprising a number of data connections to the second register.

9. A data processing system as claimed in claim 8, wherein the coupling comprises a register for the storage and transmission of the control signal to the connection elements while a next control signal is being formed.

10. A data processing system as claimed in claim 1, wherein the coupling comprises a register for the storage and transmission of the control signal to the connection elements while a next control signal is being formed.

* * * * *